(12) United States Patent
Omori et al.

(10) Patent No.: US 9,363,432 B2
(45) Date of Patent: Jun. 7, 2016

(54) IMAGE PROCESSING APPARATUS AND IMAGE PROCESSING METHOD

(71) Applicant: CANON KABUSHIKI KAISHA, Tokyo (JP)

(72) Inventors: Yuji Omori, Kawasaki (JP); Satoshi Naito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 168 days.

(21) Appl. No.: 13/904,533

(22) Filed: May 29, 2013

(65) Prior Publication Data

US 2013/0329080 A1 Dec. 12, 2013

(30) Foreign Application Priority Data

Jun. 11, 2012 (JP) ................................. 2012-132365

(51) Int. Cl.
*H04N 5/232* (2006.01)
*H04N 19/597* (2014.01)
*H04N 19/172* (2014.01)
*H04N 19/46* (2014.01)
*H04N 19/103* (2014.01)
*H04N 19/107* (2014.01)
*H04N 19/577* (2014.01)

(52) U.S. Cl.
CPC .......... *H04N 5/23229* (2013.01); *H04N 19/103* (2014.11); *H04N 19/172* (2014.11); *H04N 19/46* (2014.11); *H04N 19/597* (2014.11); *H04N 19/107* (2014.11); *H04N 19/577* (2014.11)

(58) Field of Classification Search
CPC .......... H04N 13/0011; H04N 13/0014; H04N 13/0278

USPC .......... 348/384.1–440.1, 43, 394.1, 348/409.1–419.1; 382/294, 162, 232–253, 382/43, 394.1, 409.1–419.1; 375/240.12
See application file for complete search history.

(56) References Cited

U.S. PATENT DOCUMENTS

| | | | |
|---|---|---|---|
| 7,106,909 B2 | 9/2006 | Satoh et al. | 382/239 |
| 7,215,818 B2 | 5/2007 | Naito | 382/239 |
| 8,204,136 B2 | 6/2012 | Omori | 375/240.27 |
| 8,208,743 B2 | 6/2012 | Naito | 382/233 |

(Continued)

FOREIGN PATENT DOCUMENTS

| | | |
|---|---|---|
| JP | 2003-299067 | 10/2003 |
| JP | 2006-054921 A | 2/2006 |

(Continued)

*Primary Examiner* — Sinh Tran
*Assistant Examiner* — Xi Wang
(74) *Attorney, Agent, or Firm* — Fitzpatrick, Cella, Harper & Scinto

(57) ABSTRACT

For each of respective viewpoints, the capturing condition at the viewpoint, and each frame image captured from the viewpoint in accordance with the capturing condition are acquired. One of the viewpoints is selected as a reference viewpoint by using the acquired capturing conditions. Predicting coding and intra-coding are performed for the acquired images. For each of the respective viewpoints for each frame, the coding result of the frame image captured from the viewpoint by predicting coding or intra-coding is output. When performing predicting coding for an image captured from the reference viewpoint, predicting coding is performed by referring to the image captured from the reference viewpoint without referring to images captured from the viewpoints other than the reference viewpoint.

13 Claims, 6 Drawing Sheets

(56) References Cited

U.S. PATENT DOCUMENTS

| | | | |
|---|---|---|---|
| 8,417,040 B2 | 4/2013 | Omori | 382/232 |
| 2007/0160135 A1 | 7/2007 | Ishikawa et al. | |
| 2007/0177673 A1 | 8/2007 | Yang | 375/240.25 |
| 2007/0177674 A1 | 8/2007 | Yang | 375/240.25 |
| 2007/0242900 A1* | 10/2007 | Chen et al. | 382/294 |
| 2007/0291131 A1* | 12/2007 | Suzuki | H04N 19/105 348/222.1 |
| 2008/0130738 A1* | 6/2008 | Lee | H04N 19/597 375/240.01 |
| 2008/0253671 A1* | 10/2008 | Choi | H04N 19/00533 382/238 |
| 2009/0022222 A1* | 1/2009 | He | H04N 19/597 375/240.12 |
| 2010/0150473 A1* | 6/2010 | Kwon et al. | 382/284 |
| 2010/0316122 A1* | 12/2010 | Chen | H04N 21/234327 375/240.12 |
| 2011/0255799 A1 | 10/2011 | Omori | 382/248 |
| 2011/0292998 A1 | 12/2011 | Ohguse et al. | |
| 2012/0114036 A1* | 5/2012 | Po et al. | 375/240.12 |
| 2012/0121015 A1 | 5/2012 | Yang | 375/240.12 |
| 2012/0294480 A1 | 11/2012 | Naito et al. | 382/103 |
| 2012/0314765 A1 | 12/2012 | Omori et al. | 375/240.08 |

FOREIGN PATENT DOCUMENTS

| | | | |
|---|---|---|---|
| JP | 2007-184741 | 7/2007 | H04N 13/04 |
| JP | 2009-536793 A | 10/2009 | |
| WO | WO 2007/081177 A1 | 7/2007 | |
| WO | 2011-080925 | 7/2011 | H04N 7/32 |

\* cited by examiner

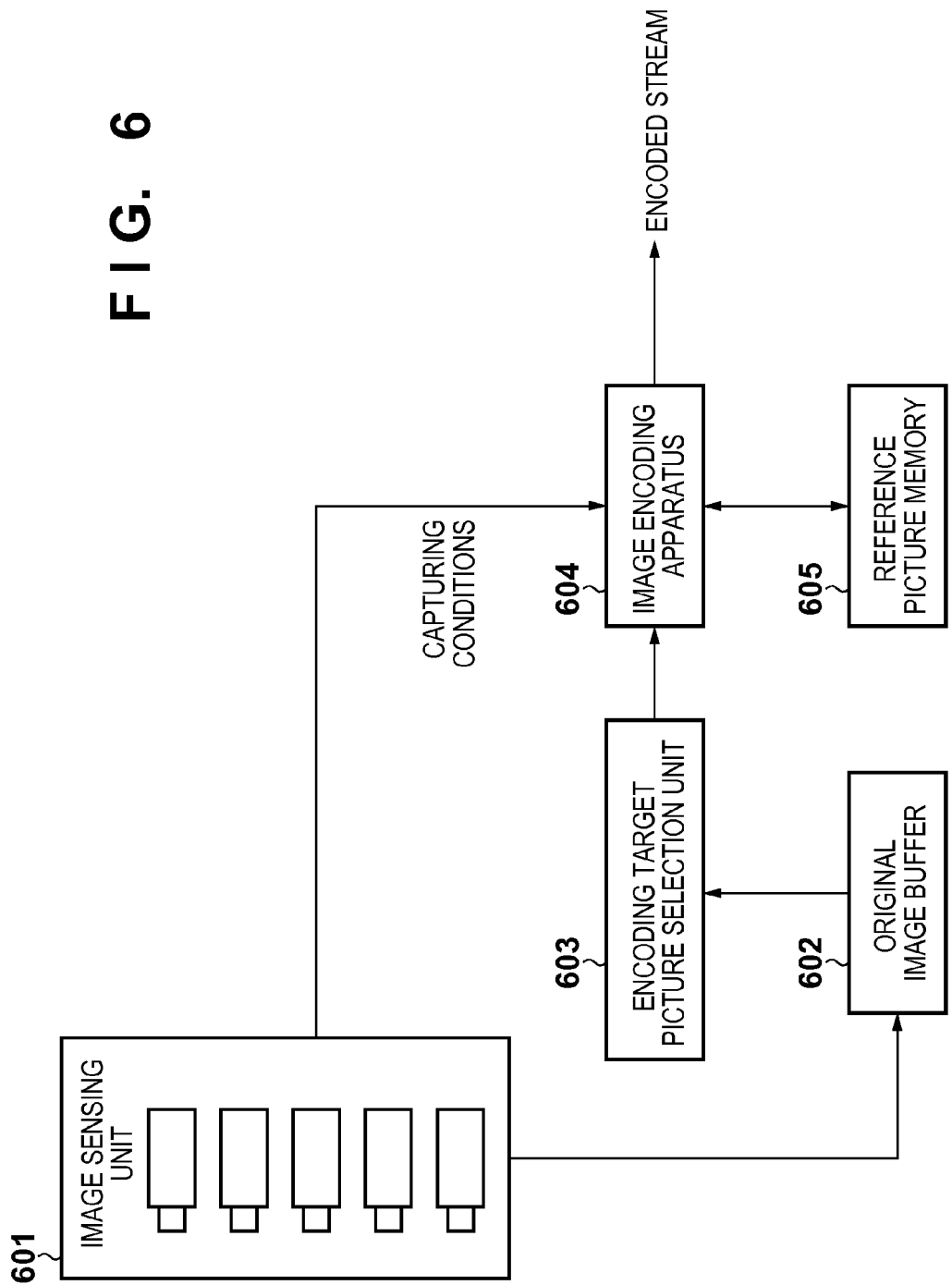

IMAGE PROCESSING APPARATUS AND IMAGE PROCESSING METHOD

BACKGROUND OF THE INVENTION

1. Field of the Invention

The present invention relates to a technique of encoding images from a plurality of viewpoints.

2. Description of the Related Art

Recently, digital cameras and digital video cameras each equipped with a plurality of lenses have made their market debut. These cameras aim at capturing images from different viewpoints under different capturing conditions for respective lenses, and providing the user with a high-quality, advanced-function image using the captured images. One purpose is to generate an HDR (High Dynamic Range) image by compositing a plurality of images having different exposure times from almost the same viewpoint. According to this technique, the exposure time is changed between lenses to capture an image in which a dark region of an object becomes clear and an image in which a bright region of the object becomes clear. Then, a plurality of captured images are composited, generating an image in which the entire object becomes clear.

When generating an HDR image, there are a system which performs processes from capturing up to composition inside a camera, and a system which saves captured images and composites images the user wants by a PC or the like after capturing.

The former system has an advantage in that it can generate an HDR image by a single camera, but the circuit which composites images costs. Further, this system cannot meet requests from the user, such as a request that he wants to see a dark region of an object more clearly after capturing, and a request that he wants to see a bright portion more clearly. In contrast, the latter system cannot composite images into an HDR image by a single camera, but can generate an image requested by the user after capturing.

However, when compositing images into an HDR image after saving a plurality of captured images, like the latter system, the data amount becomes large. The data amount increases especially for a moving image. Moving images from a plurality of viewpoints have an enormous data amount, and it is difficult to save the data in a memory card or transmit it to a server or the like via a communication network. As the number of viewpoints increases, the data amount increases.

To solve this problem, techniques for encoding images from respective viewpoints and compositing them into an HDR image have been disclosed (patent literature 1 (Japanese Patent Laid-Open No. 2003-299067) and patent literature 2 (Japanese Patent Laid-Open No. 2006-54921)). There is also disclosed a technique of reducing the data amount by using H.264 MVC (Multi View Coding) which performs inter-viewpoint prediction to predict images from a plurality of viewpoints between the viewpoints (patent literature 3 (Japanese Patent Laid-Open No. 2009-536793)).

However, the techniques disclosed in patent literatures 1 and 2 perform encoding for each viewpoint and do not perform it between viewpoints, so the code amount increases.

In patent literature 3, prediction between viewpoints is performed, but the central viewpoint is used as a reference viewpoint. Thus, when the exposure time of the central viewpoint greatly differs from those of other viewpoints, the prediction residual becomes large, increasing the code amount. The reference viewpoint is a base view in H.264 MVC. When encoding the reference viewpoint, inter-viewpoint prediction from other viewpoints is not executed. For the other viewpoints, inter-viewpoint prediction is performed using the reference viewpoint, or inter-viewpoint prediction is performed further using a viewpoint having undergone inter-viewpoint prediction using the reference viewpoint. In, for example, an image in which the exposure time of the central viewpoint greatly differs from those of other viewpoints, and a shadow detail loss or highlight detail loss occurs, if the central viewpoint is set as a reference viewpoint, the prediction residual becomes large, increasing the code amount.

SUMMARY OF THE INVENTION

The present invention has been made in consideration of the above problems, and provides a technique for efficiently encoding images from a plurality of viewpoints under different capturing conditions.

According to one aspect of the present invention, there is provided an image processing apparatus comprising: an acquisition unit which acquires, for each of respective viewpoints, capturing condition at the viewpoint, and each frame image captured from the viewpoint in accordance with the capturing condition; a selection unit which selects one of the respective viewpoints as a reference viewpoint by using the capturing conditions acquired by the acquisition unit for the respective viewpoints; a predicting coding unit which performs predicting coding for the frame images acquired by the acquisition unit; an intra-coding unit which performs intra-coding for the frame images acquired by the acquisition unit; and an output unit which outputs, for each of the respective viewpoints for each frame, coding result of the frame image captured from the viewpoint by the predicting coding unit or the intra-coding unit, wherein when performing predicting coding for a frame image captured from the reference viewpoint, the predicting coding unit performs predicting coding by referring to the frame image captured from the reference viewpoint without referring to frame images captured from the viewpoints other than the reference viewpoint.

According to another aspect of the present invention, there is provided an image processing method to be performed by an image processing apparatus, comprising: an acquisition step of acquiring, for each of respective viewpoints, capturing condition at the viewpoint, and each frame image captured from the viewpoint in accordance with the capturing condition; a selection step of selecting one of the respective viewpoints as a reference viewpoint by using the capturing conditions acquired in the acquisition step for the respective viewpoints; a predicting coding step of performing predicting coding for the frame images acquired in the acquisition step; an intra-coding step of performing intra-coding for the frame images acquired in the acquisition step; and an output step of outputting, for each of the respective viewpoints for each frame, coding result of the frame image captured from the viewpoint in the predicting coding step or the intra-coding step, wherein in the predicting coding step, when performing predicting coding for a frame image captured from the reference viewpoint, predicting coding is performed by referring to the frame image captured from the reference viewpoint without referring to frame images captured from the viewpoints other than the reference viewpoint.

Further features of the present invention will become apparent from the following description of exemplary embodiments with reference to the attached drawings.

BRIEF DESCRIPTION OF THE DRAWINGS

FIG. 6 is a block diagram exemplifying the arrangement of a capturing system.

DESCRIPTION OF THE EMBODIMENTS

Figure 1:
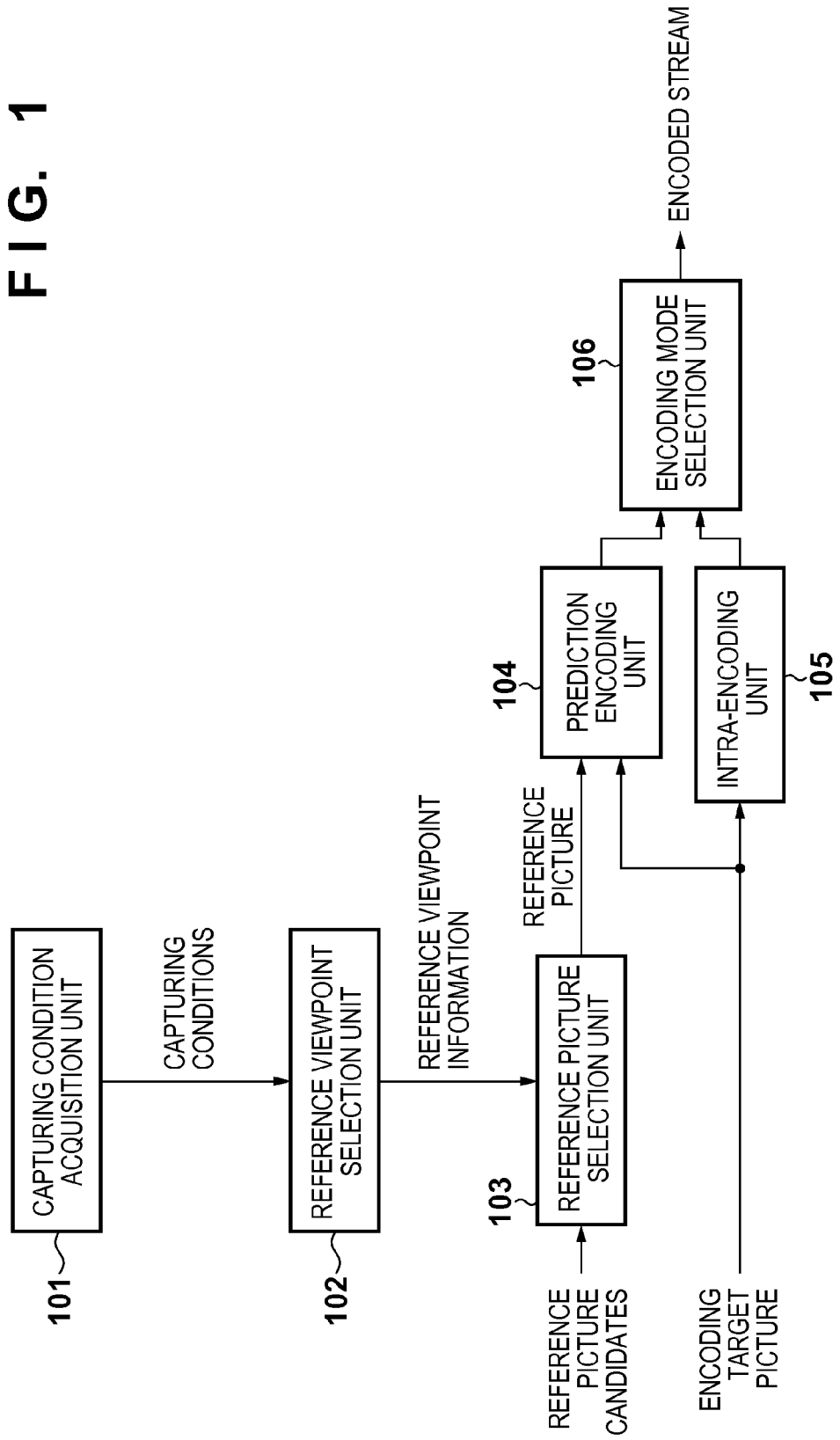
FIG. 1 is a block diagram exemplifying the functional arrangement of an image encoding apparatus 604.

Embodiments of the present invention will now be described with reference to the accompanying drawings. Note that the following embodiments are merely examples of concretely practicing the present invention, and are concrete examples of arrangements defined in the appended claims.

First Embodiment

First, the arrangement of a capturing system including an image encoding apparatus functioning as an image processing apparatus will be exemplified with reference to the block diagram of FIG. 6. The capturing system according to the embodiment captures images from a plurality of viewpoints, and encodes and outputs the captured images.

An image sensing unit 601 includes lenses (viewpoints) and sensors, and can capture and develop five images (moving images) from five different viewpoints. The viewpoints are arranged in the vertical direction. Note that the arrangement of the image sensing unit 601 is not limited to this. For example, the number of viewpoints may be different from five. The viewpoint arrangement pattern may be not a one-dimensional vertical array, but a one-dimensional horizontal array or a two-dimensional array in which viewpoints are arranged in a matrix.

The image sensing unit 601 can set different capturing conditions for the respective viewpoints, and capture images. The capturing conditions for the respective viewpoints may be calculated and set by the system based on environmental information measured by various sensors, or the user may set capturing conditions by operating a user interface (not shown). That is, the method of setting capturing conditions for respective viewpoints is not limited to a specific method.

For the respective viewpoints, the image sensing unit 601 outputs, to an original image buffer 602, images of each frame captured from the respective viewpoints, and outputs the capturing conditions of the images to an image encoding apparatus 604. The capturing conditions will be described later.

The original image buffer 602 is a memory for storing images (original images) of each frame captured from the respective viewpoints by the image sensing unit 601.

An encoding target picture selection unit 603 selects an encoding target image from images stored in the original image buffer 602, and supplies the selected image to the image encoding apparatus 604.

The image encoding apparatus 604 encodes an image supplied from the encoding target picture selection unit 603 while appropriately referring to a reference picture stored in a reference picture memory 605 based on capturing conditions obtained from the image sensing unit 601. The image encoding apparatus 604 stores, as a reference picture in the reference picture memory 605, an image obtained by locally decoding an encoded image. In the following description, "local decoding" is used as both the meaning of locally decoding an encoded image and the meaning of performing no processing for an unencoded original image.

Next, the functional arrangement of the image encoding apparatus 604 will be exemplified with reference to the block diagram of FIG. 1.

A capturing condition acquisition unit 101 acquires a capturing condition sent from the image sensing unit 601, and sends the acquired capturing condition to a reference viewpoint selection unit 102 at the subsequent stage. The capturing condition is acquired for each viewpoint of the image sensing unit 601. In the embodiment, the capturing condition includes a set of identification information (viewpoint number) unique to a viewpoint and the exposure time of a lens at the viewpoint. Instead of the exposure time, the f-number of the lens, brightness, lens position, sensor sensitivity, or the like or a combination of them may be used.

Upon acquiring capturing conditions for the respective viewpoints from the capturing condition acquisition unit 101, the reference viewpoint selection unit 102 selects one of the viewpoints as a reference viewpoint by using exposure times in the capturing conditions. The reference viewpoint selection unit 102 sends, as selected viewpoint information to a reference picture selection unit 103, information representing the selected viewpoint.

The reference picture selection unit 103 reads out, by using reference viewpoint information based on <selection criterion 1> to be described later, a reference picture to be used to perform prediction encoding by a prediction encoding unit 104, among reference pictures stored in the reference picture memory 605. The reference picture selection unit 103 sends the readout reference picture to the prediction encoding unit 104.

The image selected by the encoding target picture selection unit 603 is supplied as an encoding target picture to the prediction encoding unit 104 and an intra-encoding unit 105.

The prediction encoding unit 104 generates prediction-encoded data by performing prediction encoding using the reference picture sent from the reference picture selection unit 103 for the encoding target picture supplied from the encoding target picture selection unit 603. More specifically, the prediction encoding unit 104 generates a predicted picture of the encoding target picture by using the reference picture from the reference picture selection unit 103, quantizes the difference between the encoding target picture and the predicted picture, and performs entropy encoding for the quantization result, thereby generating prediction-encoded data. The prediction encoding unit 104 sends the generated prediction-encoded data to an encoding mode selection unit 106 at the subsequent stage.

If the viewpoints of the encoding target picture and reference picture are different, the prediction encoding unit 104 performs inter-viewpoint prediction. If the viewpoints of the encoding target picture and reference picture are the same but their capturing times are different, the prediction encoding unit 104 performs inter-frame prediction.

The intra-encoding unit 105 performs intra-encoding for the encoding target picture supplied from the encoding target picture selection unit 603, thereby generating intra-encoded data. More specifically, the intra-encoding unit 105 generates intra-predicted data by performing intra-prediction for the encoding target picture, and generates intra-encoded data by performing quantization and entropy encoding processing for the intra-predicted data. The intra-encoding unit 105 sends the generated intra-encoded data to the encoding mode selection unit 106 at the subsequent stage.

The encoding mode selection unit 106 outputs, as an encoded stream, either the prediction-encoded data from the prediction encoding unit 104 or the intra-encoded data from the intra-encoding unit 105. For example, the encoding mode selection unit 106 may compare the code amount of the prediction-encoded data with that of the intra-encoded data, and output encoded data having a smaller code amount. The output destination of the encoding mode selection unit 106 is not limited to a specific output destination. The encoding mode selection unit 106 may output encoded data to the internal memory of the image encoding apparatus 604 or output (transmit) it to an external device via a network.

In the embodiment, the prediction encoding unit 104 and intra-encoding unit 105 execute quantization and entropy encoding processing. However, the following modification is also possible. More specifically, the prediction encoding unit 104 generates and outputs a difference picture between an encoding target picture and a predicted picture created from a reference picture. The intra-encoding unit 105 outputs intra-predicted data obtained by performing intra-prediction. The encoding mode selection unit 106 compares the difference picture and intra-predicted data, selects data having a smaller data amount, and performs quantization and entropy encoding for the selected data. That is, data having a smaller data size during encoding may be output. Data amounts may be compared by comparing SADs (Sums of Absolute Differences) which are the sums of the absolute differences of respective data.

Next, encoding processing for images of each frame captured from the respective viewpoints when the number of viewpoints in the image sensing unit 601 is five will be explained with reference to FIG. 2. Note that the following description can be similarly expanded to a case in which the number of viewpoints is different from five.

Figure 2:
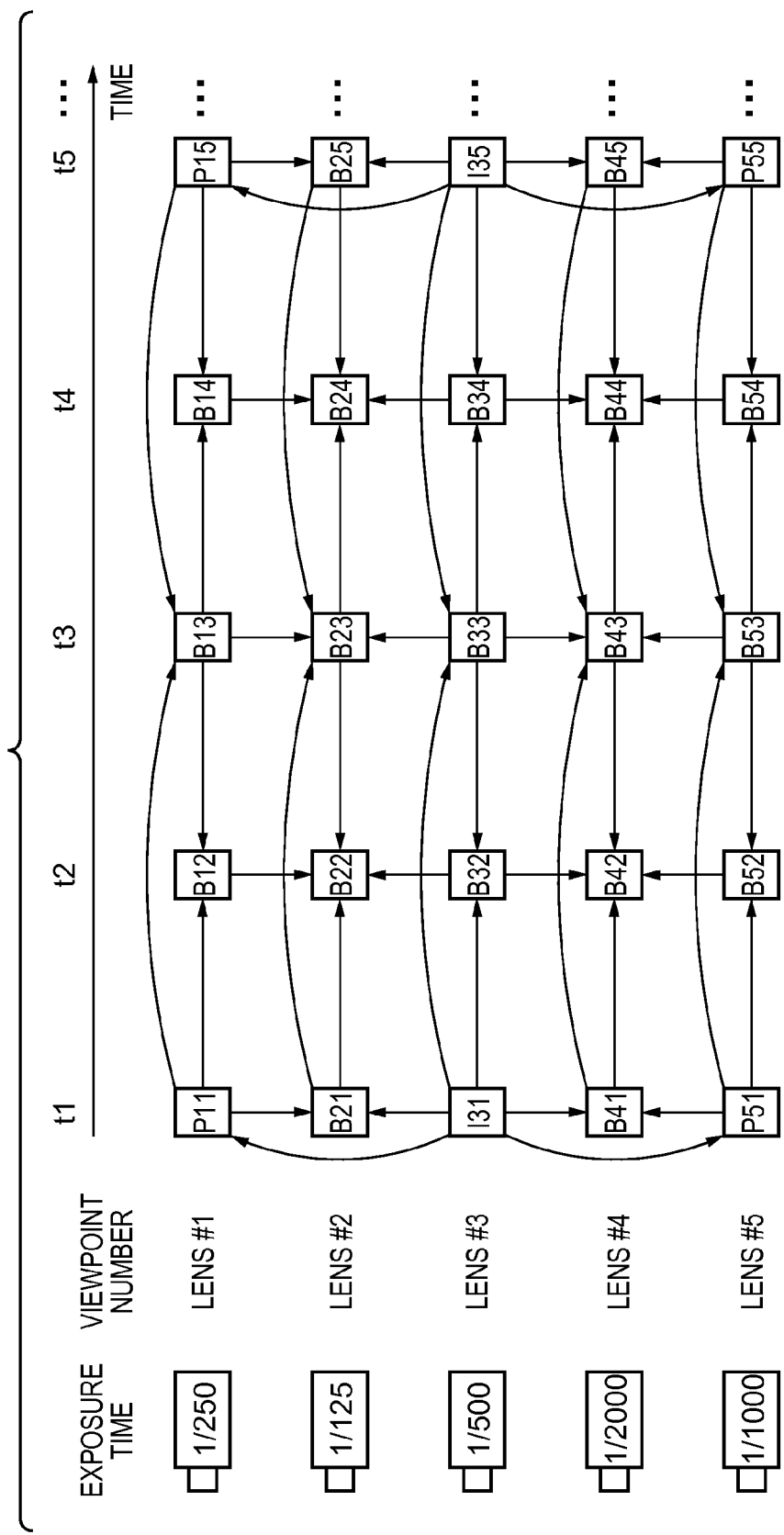
FIG. 2 is a view for explaining encoding processing.

In FIG. 2, the ordinate represents the viewpoint number (identification information unique to a viewpoint) of each viewpoint (lens), and the exposure time of the viewpoint. In the embodiment, as described in association with the image sensing unit 601, the five viewpoints are arranged in the vertical direction in the viewpoint number order, as shown in FIG. 2.

The abscissa represents the time, and the time elapses rightward. t1, t2, t3, . . . represent times corresponding to respective frames. Images are captured from the respective viewpoints at times t1, t2, t3, . . . , so five images are captured at every time.

A quadrangle represents one picture at each viewpoint. The first alphabetical letter in the quadrangle represents the type of reference picture, the second numeral represents the viewpoint number, and the third numeral represents the time number. As the type of reference picture, I is an I-picture having undergone intra-prediction, P is a P-picture having undergone forward prediction, and B is a B-picture having undergone bidirectional prediction or prediction based on a plurality of reference pictures. Note that forward prediction is prediction encoding using only one reference picture. For example, "P11" is a picture obtained by performing forward prediction for an image captured from the viewpoint of viewpoint number 1 at time t1. An arrow between pictures indicates a reference relationship between them. For example, "P11" uses "I31" as a reference picture, and serves as a reference picture for B21, B12, and B13.

Next, the operation of the image encoding apparatus 604 shown in FIG. 1 will be explained with reference to FIGS. 2 and 6.

First, the capturing condition acquisition unit 101 acquires, from the image sensing unit 601, the capturing conditions of the respective viewpoints of the image sensing unit 601, that is, sets each of identification information (viewpoint number) unique to each viewpoint and the exposure time of the lens at the viewpoint. In this case, a set of (viewpoint number, exposure time) is acquired for the five respective viewpoints, so five sets of (1, 1/250), (2, 1/125), (3, 1/500), (4, 1/2000), and (5, 1/1000) are acquired. The capturing condition acquisition unit 101 sends the five acquired sets to the reference viewpoint selection unit 102 at the subsequent stage.

The reference viewpoint selection unit 102 refers to the exposure times in these five sets, and specifies, as the viewpoint number of a reference viewpoint, a viewpoint number in a set containing an exposure time serving as a median. In FIG. 2, the median is 1/500 among the exposure times of 1/250, 1/125, 1/500, 1/2000, and 1/1000, and a viewpoint number in a set containing the median of 1/500 is "3". Hence, the reference viewpoint selection unit 102 sends "3" as reference viewpoint information to the reference picture selection unit 103.

Note that the method of specifying reference viewpoint information is not limited to this method, and another method is also conceivable. For example, the average value (average time) of the exposure times of 1/250, 1/125, 1/500, 1/2000, and 1/1000 may be calculated, and a viewpoint number in a set containing an exposure time closest to the calculated average value may be set as reference viewpoint information. In the embodiment, the reference viewpoint does not change in a series of encoding processes to generate one stream, regardless of the method of specifying reference viewpoint information. The reference viewpoint selection unit 102 sends the specified viewpoint number as reference viewpoint information to the reference picture selection unit 103.

Next, encoding for images of each frame captured at time t1 from the respective viewpoints starts. The encoding target picture selection unit 603 selects, from the original image buffer 602, an image captured at time t1 from the viewpoint of viewpoint number 3 selected as the reference viewpoint, and supplies it as an encoding target picture to the image encoding apparatus 604. The encoding target picture supplied from the encoding target picture selection unit 603 to the image encoding apparatus 604 is actually supplied to the prediction encoding unit 104 and intra-encoding unit 105.

At this time, no reference picture exists in the reference picture memory 605, so the reference picture selection unit 103 does not select a reference picture. Since no reference picture exists, the prediction encoding unit 104 does not perform prediction encoding. In contrast, the intra-encoding unit 105 generates intra-encoded data by performing intra-encoding for the supplied encoding target picture, and sends the generated intra-encoded data to the encoding mode selection unit 106 at the subsequent stage.

The encoding mode selection unit 106 sends the intra-encoded data sent from the intra-encoding unit 105 as the encoded stream of the image at the reference viewpoint. The encoded stream is expressed as I31 because it has been obtained by intra-encoding.

The encoding target picture selection unit 603 selects, from the original image buffer 602, an image captured at time t1 from the viewpoint of viewpoint number 1, and supplies it as an encoding target picture to the image encoding apparatus 604. At this time, a picture obtained by locally decoding I31 has been stored as a reference picture in the reference picture memory 605. The reference picture selection unit 103 selects a reference picture from the reference picture memory 605 based on selection criterion 1:

<Selection Criterion 1>

(1) A picture for which the distance between viewpoints is equal to or larger than three or more viewpoint numbers is excluded from reference pictures.

(2) A picture for which the time is equal to or larger than three or more frames is excluded from reference pictures.

(3) A B-picture for which the distance between viewpoints is equal to or larger than two or more viewpoint numbers or the time is equal to or larger than two or more frames is excluded from reference pictures.

(4) A P-picture for which the distance between viewpoints is equal to or larger than three or more viewpoint numbers or the time is equal to or larger than three or more frames is excluded from reference pictures.

(5) A picture for which inter-viewpoint prediction is performed across the reference viewpoint is excluded from reference pictures.

That is, the reference picture selection unit 103 selects, as a reference picture, a picture which satisfies none of (1) to (5) of selection criterion 1.

(2) of selection criterion 1 means that, when an image captured at time t1 is set as an encoding target picture, pictures at times t4 and t5 are excluded from reference pictures. Although the embodiment uses selection criterion 1 as a criterion for selecting a reference picture, another selection criterion may be used. In H.264 MVC, only pictures from the same viewpoint at different times, or only pictures from different viewpoints at the same time can be referred to. The remaining pictures are therefore excluded in advance from reference picture candidates.

The reference picture selection unit 103 selects I31 as a reference picture from the reference picture memory 605 and sends the selected reference picture I31 to the prediction encoding unit 104.

The prediction encoding unit 104 uses I31 sent from the reference picture selection unit 103 as a reference picture, and performs forward prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 sends, as an encoded stream, data having a smaller code amount out of the prediction-encoded data output from the prediction encoding unit 104 and the intra-encoded data output from the intra-encoding unit 105. Since an image captured at time t1 from the viewpoint of viewpoint number 1 has been obtained by inter-viewpoint prediction from only I31, its encoded stream is expressed as P11.

After that, the encoding target picture selection unit 603 selects, from the original image buffer 602, an image captured at time t1 from the viewpoint of viewpoint number 2, and supplies it as an encoding target picture to the image encoding apparatus 604. At this time, pictures obtained by locally decoding I31 and P11 have been stored as reference pictures in the reference picture memory 605.

The reference picture selection unit 103 selects a reference picture from the reference picture memory 605 based on selection criterion 1 described above. As a result, I31 and P11 are selected as reference pictures. The reference picture selection unit 103 sends, to the prediction encoding unit 104, I31 and P11 selected from the reference picture memory 605.

The prediction encoding unit 104 uses I31 and P11 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t1 from the viewpoint of viewpoint number 2 has been obtained by inter-viewpoint prediction from I31 and P11, its encoded stream is expressed as B21.

Then, the encoding target picture selection unit 603 selects, from the original image buffer 602, an image captured at time t1 from the viewpoint of viewpoint number 5, and supplies it as an encoding target picture to the image encoding apparatus 604. At this time, pictures obtained by locally decoding I31, P11, and B21 have been stored as reference pictures in the reference picture memory 605.

The reference picture selection unit 103 selects a reference picture from the reference picture memory 605 based on selection criterion 1 described above. As a result, I31 is selected as a reference picture. The reference picture selection unit 103 sends, to the prediction encoding unit 104, I31 selected from the reference picture memory 605.

The prediction encoding unit 104 uses I31 sent from the reference picture selection unit 103 as a reference picture, and performs forward prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t1 from the viewpoint of viewpoint number 5 has been obtained by inter-viewpoint prediction from only I31, its encoded stream is expressed as P51.

Thereafter, the encoding target picture selection unit 603 selects, from the original image buffer 602, an image captured at time t1 from the viewpoint of viewpoint number 4, and supplies it as an encoding target picture to the image encoding apparatus 604. At this time, pictures obtained by locally decoding I31, P11, B21, and P51 have been stored as reference pictures in the reference picture memory 605.

The reference picture selection unit 103 selects a reference picture from the reference picture memory 605 based on selection criterion 1 described above. As a result, I31 and P51 are selected as reference pictures. The reference picture selection unit 103 sends, to the prediction encoding unit 104, I31 and P51 selected from the reference picture memory 605.

The prediction encoding unit 104 uses I31 and P51 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t1 from the viewpoint of viewpoint number 4 has been obtained by inter-viewpoint prediction from I31 and P51, its encoded stream is expressed as B41.

In this manner, images captured at time t1 from the respective viewpoints (viewpoints of viewpoint numbers 1 to 5) are encoded. At time t5, encoding of images captured at time t5 from the respective viewpoints (viewpoints of viewpoint numbers 1 to 5) starts. Although encoding can be executed in the order of times t2, t3, t4, and t5, a larger number of reference pictures improve the encoding efficiency. Thus, pictures at times t2, t3, and t4 are held in the buffer, and encoding at time t5 is executed first.

First, the encoding target picture selection unit 603 selects, from the original image buffer 602, an image captured at time t5 from the viewpoint of viewpoint number 3 selected as the reference viewpoint, and supplies it as an encoding target picture to the image encoding apparatus 604.

Although I31 has been stored in the reference picture memory 605, it meets selection criterion 1 and the reference picture selection unit 103 does not select a reference picture. Since no reference picture exists, the prediction encoding unit 104 does not perform prediction encoding. To the contrary, the intra-encoding unit 105 generates intra-encoded data by performing intra-encoding for the supplied encoding target picture, and sends the generated intra-encoded data to the encoding mode selection unit 106 at the subsequent stage.

The encoding mode selection unit 106 sends the intra-encoded data sent from the intra-encoding unit 105 as the encoded stream of the image at the reference viewpoint. The encoded stream is expressed as I35 because it has been obtained by intra-encoding.

The encoding target picture selection unit 603 selects, from the original image buffer 602, an image captured at time t5 from the viewpoint of viewpoint number 1, and supplies it as an encoding target picture to the image encoding apparatus 604. At this time, pictures obtained by locally decoding I35 and P11 have been stored as reference pictures in the reference picture memory 605.

The reference picture selection unit 103 selects I35 as a reference picture from the reference picture memory 605 based on selection criterion 1, and sends the selected reference picture I35 to the prediction encoding unit 104.

The prediction encoding unit 104 uses I35 sent from the reference picture selection unit 103 as a reference picture, and performs forward prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t5 from the viewpoint of viewpoint number 1 has been obtained by inter-viewpoint prediction from only I35, its encoded stream is expressed as P15.

After that, the encoding target picture selection unit 603 selects, from the original image buffer 602, an image captured at time t5 from the viewpoint of viewpoint number 2, and supplies it as an encoding target picture to the image encoding apparatus 604. At this time, pictures obtained by locally decoding I35, P15, and B21 have been stored as reference pictures in the reference picture memory 605.

The reference picture selection unit 103 selects a reference picture from the reference picture memory 605 based on selection criterion 1. As a result, I35 and P15 are selected as reference pictures. The reference picture selection unit 103 sends I35 and P15 selected from the reference picture memory 605 to the prediction encoding unit 104.

The prediction encoding unit 104 uses I35 and P15 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t5 from the viewpoint of viewpoint number 2 has been obtained by inter-viewpoint prediction from I35 and P15, its encoded stream is expressed as B25.

Then, the encoding target picture selection unit 603 selects, from the original image buffer 602, an image captured at time t5 from the viewpoint of viewpoint number 5, and supplies it as an encoding target picture to the image encoding apparatus 604. At this time, pictures obtained by locally decoding I35, P15, B25, and P51 have been stored as reference pictures in the reference picture memory 605.

The reference picture selection unit 103 selects a reference picture from the reference picture memory 605 based on selection criterion 1. As a result, I35 is selected as a reference picture. The reference picture selection unit 103 sends I35 selected from the reference picture memory 605 to the prediction encoding unit 104.

The prediction encoding unit 104 uses I35 sent from the reference picture selection unit 103 as a reference picture, and performs forward prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t5 from the viewpoint of viewpoint number 5 has been obtained by inter-viewpoint prediction from only I35, its encoded stream is expressed as P55.

Thereafter, the encoding target picture selection unit 603 selects, from the original image buffer 602, an image captured at time t5 from the viewpoint of viewpoint number 4, and supplies it as an encoding target picture to the image encoding apparatus 604. At this time, pictures obtained by locally decoding I35, P15, B25, P55, and B41 have been stored as reference pictures in the reference picture memory 605.

The reference picture selection unit 103 selects a reference picture from the reference picture memory 605 based on selection criterion 1. As a result, I35 and P55 are selected as reference pictures. The reference picture selection unit 103 sends I35 and P55 selected from the reference picture memory 605 to the prediction encoding unit 104.

The prediction encoding unit 104 uses I35 and P55 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t5 from the viewpoint of viewpoint number 4 has been obtained by inter-viewpoint prediction from I35 and P55, its encoded stream is expressed as B45.

In this way, encoding at time t5 is executed. Next, encoding at time t3 starts. Although encoding can be executed in the order of times t2, t3, and t4, a larger number of reference pictures improve the encoding efficiency. Thus, pictures at times t2 and t4 are held in the original image buffer 602, and encoding at time t3 is executed first.

First, the encoding target picture selection unit 603 selects, from the original image buffer 602, an image captured at time t3 from the viewpoint of viewpoint number 3 selected as the reference viewpoint, and supplies it as an encoding target picture to the image encoding apparatus 604. At this time, pictures obtained by locally decoding I31 and I35 have been stored as reference pictures in the reference picture memory 605.

The reference picture selection unit 103 selects a reference picture from the reference picture memory 605 based on selection criterion 1. As a result, I31 and I35 are selected as reference pictures. The reference picture selection unit 103 sends I31 and I35 selected from the reference picture memory 605 to the prediction encoding unit 104.

The prediction encoding unit 104 uses I31 and I35 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t3 from the viewpoint of viewpoint number 3 has been obtained by inter-viewpoint prediction from I31 and I35, its encoded stream is expressed as B33.

Then, the encoding target picture selection unit 603 selects, from the original image buffer 602, an image captured at time t3 from the viewpoint of viewpoint number 1, and supplies it as an encoding target picture to the image encoding apparatus 604. At this time, pictures obtained by locally decoding P11, P15, and B33 have been stored as reference pictures in the reference picture memory 605.

The reference picture selection unit 103 selects P11 and P15 as reference pictures from the reference picture memory 605 based on selection criterion 1. The reference picture selection unit 103 sends the selected reference pictures P11 and P15 to the prediction encoding unit 104.

The prediction encoding unit 104 uses P11 and P15 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t3 from the viewpoint of viewpoint number 1 has been obtained by inter-viewpoint prediction from P11 and P15, its encoded stream is expressed as B13.

Thereafter, the encoding target picture selection unit 603 selects, from the original image buffer 602, an image captured at time t3 from the viewpoint of viewpoint number 2, and supplies it as an encoding target picture to the image encoding apparatus 604. At this time, pictures obtained by locally decoding B13, B33, B21, and B25 have been stored as reference pictures in the reference picture memory 605.

The reference picture selection unit 103 selects a reference picture from the reference picture memory 605 based on selection criterion 1. As a result, B13, B33, B21, and B25 are selected as reference pictures. The reference picture selection unit 103 sends B13, B33, B21, and B25 selected from the reference picture memory 605 to the prediction encoding unit 104.

The prediction encoding unit 104 uses B13, B33, B21, and B25 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t3 from the viewpoint of viewpoint number 2 has been obtained by inter-viewpoint prediction from B13, B33, B21, and B25, its encoded stream is expressed as B23.

After that, the encoding target picture selection unit 603 selects, from the original image buffer 602, an image captured at time t3 from the viewpoint of viewpoint number 5, and supplies it as an encoding target picture to the image encoding apparatus 604. At this time, pictures obtained by locally decoding B13, B23, B33, P51, and P55 have been stored as reference pictures in the reference picture memory 605.

The reference picture selection unit 103 selects a reference picture from the reference picture memory 605 based on selection criterion 1. As a result, P51 and P55 are selected as reference pictures. The reference picture selection unit 103 sends P51 and P55 selected from the reference picture memory 605 to the prediction encoding unit 104.

The prediction encoding unit 104 uses P51 and P55 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t3 from the viewpoint of viewpoint number 5 has been obtained by inter-viewpoint prediction from P51 and P55, its encoded stream is expressed as B53.

Then, the encoding target picture selection unit 603 selects, from the original image buffer 602, an image captured at time t3 from the viewpoint of viewpoint number 4, and supplies it as an encoding target picture to the image encoding apparatus 604. At this time, pictures obtained by locally decoding B13, B23, B33, B53, B41, and B45 have been stored as reference pictures in the reference picture memory 605.

The reference picture selection unit 103 selects a reference picture from the reference picture memory 605 based on selection criterion 1. As a result, B33, B53, B41, and B45 are selected as reference pictures. The reference picture selection unit 103 sends B33, B53, B41, and B45 selected from the reference picture memory 605 to the prediction encoding unit 104.

The prediction encoding unit 104 uses B33, B53, B41, and B45 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t3 from the viewpoint of viewpoint number 4 has been obtained by inter-viewpoint prediction from B33, B53, B41, and B45, its encoded stream is expressed as B43.

In this way, encoding at time t3 is executed. Next, encoding at time t2 starts. First, the encoding target picture selection unit 603 selects, from the original image buffer 602, an image captured at time t2 from the viewpoint of viewpoint number 3 selected as the reference viewpoint, and supplies it as an encoding target picture to the image encoding apparatus 604. At this time, pictures obtained by locally decoding I31, I35, and B33 have been stored as reference pictures in the reference picture memory 605.

The reference picture selection unit 103 selects a reference picture from the reference picture memory 605 based on selection criterion 1. As a result, I31 and B33 are selected as reference pictures. The reference picture selection unit 103 sends I31 and B33 selected from the reference picture memory 605 to the prediction encoding unit 104.

The prediction encoding unit 104 uses I31 and B33 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t2 from the viewpoint of viewpoint number 3 has been obtained by inter-viewpoint prediction from I31 and B33, its encoded stream is expressed as B32.

Then, the encoding target picture selection unit 603 selects, from the original image buffer 602, an image captured at time t2 from the viewpoint of viewpoint number 1, and supplies it as an encoding target picture to the image encoding apparatus 604. At this time, pictures obtained by locally decoding B32, P11, B13, and P15 have been stored as reference pictures in the reference picture memory 605.

The reference picture selection unit 103 selects P11 and B13 as reference pictures from the reference picture memory 605 based on selection criterion 1. The reference picture selection unit 103 sends the selected reference pictures P11 and B13 to the prediction encoding unit 104.

The prediction encoding unit 104 uses P11 and B13 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t2 from the viewpoint of viewpoint number 1 has been obtained by inter-viewpoint prediction from P11 and P13, its encoded stream is expressed as B12.

Thereafter, the encoding target picture selection unit 603 selects, from the original image buffer 602, an image captured at time t2 from the viewpoint of viewpoint number 2, and supplies it as an encoding target picture to the image encoding apparatus 604. At this time, pictures obtained by locally decoding B12, B32, B21, B23, and B25 have been stored as reference pictures in the reference picture memory 605.

The reference picture selection unit 103 selects a reference picture from the reference picture memory 605 based on selection criterion 1. As a result, B12, B32, B21, and B23 are selected as reference pictures. The reference picture selection unit 103 sends B12, B32, B21, and B23 selected from the reference picture memory 605 to the prediction encoding unit 104.

The prediction encoding unit 104 uses B12, B32, B21, and B23 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t2 from the viewpoint of viewpoint number 2 has been obtained by inter-viewpoint prediction from B12, B32, B21, and B23, its encoded stream is expressed as B22.

After that, the encoding target picture selection unit 603 selects, from the original image buffer 602, an image captured at time t2 from the viewpoint of viewpoint number 5, and supplies it as an encoding target picture to the image encoding apparatus 604. At this time, pictures obtained by locally decoding B12, B22, B32, P51, B53, and P55 have been stored as reference pictures in the reference picture memory 605.

The reference picture selection unit 103 selects a reference picture from the reference picture memory 605 based on selection criterion 1. As a result, P51 and B53 are selected as reference pictures. The reference picture selection unit 103 sends P51 and B53 selected from the reference picture memory 605 to the prediction encoding unit 104.

The prediction encoding unit 104 uses P51 and B53 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t2 from the viewpoint of viewpoint number 5 has been obtained by inter-viewpoint prediction from P51 and B53, its encoded stream is expressed as B52.

Then, the encoding target picture selection unit 603 selects, from the original image buffer 602, an image captured at time t2 from the viewpoint of viewpoint number 4, and supplies it as an encoding target picture to the image encoding apparatus 604. At this time, pictures obtained by locally decoding B12, B22, B32, B52, B41, B43, and B45 have been stored as reference pictures in the reference picture memory 605.

The reference picture selection unit 103 selects a reference picture from the reference picture memory 605 based on selection criterion 1. As a result, B32, B52, B41, and B43 are selected as reference pictures. The reference picture selection unit 103 sends B32, B52, B41, and B43 selected from the reference picture memory 605 to the prediction encoding unit 104.

The prediction encoding unit 104 uses B32, B52, B41, and B43 sent from the reference picture selection unit 103 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t2 from the viewpoint of viewpoint number 4 has been obtained by inter-viewpoint prediction from B32, B52, B41, and B43, its encoded stream is expressed as B42.

In this fashion, encoding at time t3 is executed. Encoding at time t4 is performed similarly to encoding at time t3, but the processing is the same and a description thereof will not be repeated. The same processing as described above is repeated until encoding of all pictures is completed.

The above-described method performs inter-viewpoint prediction for pictures from viewpoints close in capturing condition to the viewpoint of an encoding target picture. Accordingly, the prediction residual becomes smaller than that in a conventional method, increasing the encoding efficient.

Second Embodiment

Figure 3:
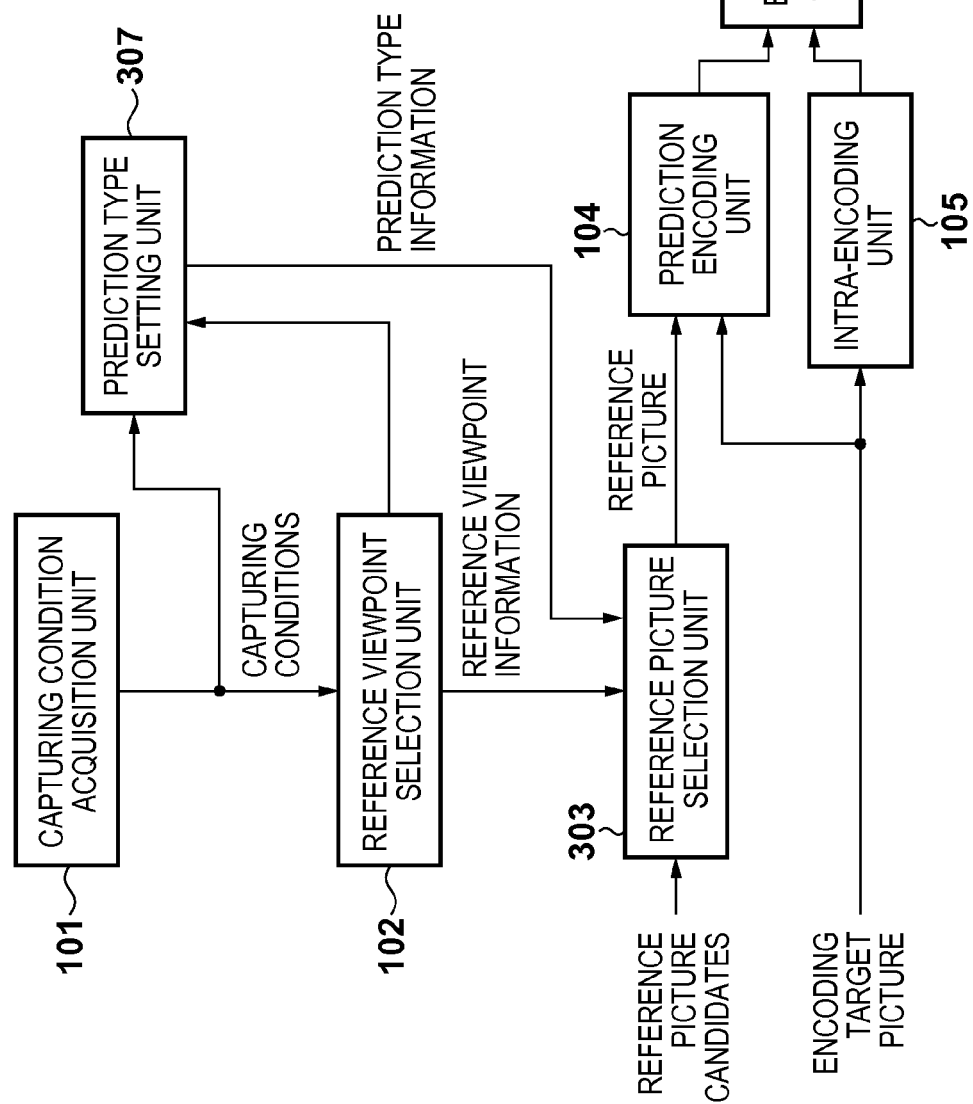
FIG. 3 is a block diagram exemplifying the functional arrangement of the image encoding apparatus 604.

A capturing system according to the second embodiment has the arrangement shown in FIG. 6, similar to the first embodiment. The second embodiment is different from the first embodiment (FIG. 1) in the arrangement of an image encoding apparatus 604. The functional arrangement of the image encoding apparatus 604 according to the second embodiment will be explained with reference to the block diagram of FIG. 3. In FIG. 3, the same reference numerals as those in FIG. 1 denote the same parts, and a description thereof will not be repeated.

A prediction type setting unit 307 generates prediction type information which sets, from capturing conditions acquired by a capturing condition acquisition unit 101, the prediction type of each viewpoint for a forward predicted picture to minimize the difference between capturing conditions in inter-viewpoint prediction. In the second embodiment, the prediction type information is formed from 1 bit. When the 1 bit is "1", this means that forward prediction is performed, and when it is "0", this means that prediction is performed based on selection criterion 1. The prediction type setting unit 307 outputs the generated prediction type information to a reference picture selection unit 303.

Upon receiving the prediction type information from the prediction type setting unit 307, in addition to reference viewpoint information from a reference viewpoint selection unit 102, the reference picture selection unit 303 selects a reference picture from a reference picture memory 605 based on these pieces of information. The reference picture selection unit 303 selects one reference picture when the prediction type information is "1", and selects a reference picture in accordance with selection criterion 1, similar to the first embodiment, when the prediction type information is "0". When the prediction type information is "1" and a plurality of pictures are stored in the reference picture memory 605, a picture from a viewpoint closest to that of an encoding target picture is selected as a reference picture.

Figure 4:
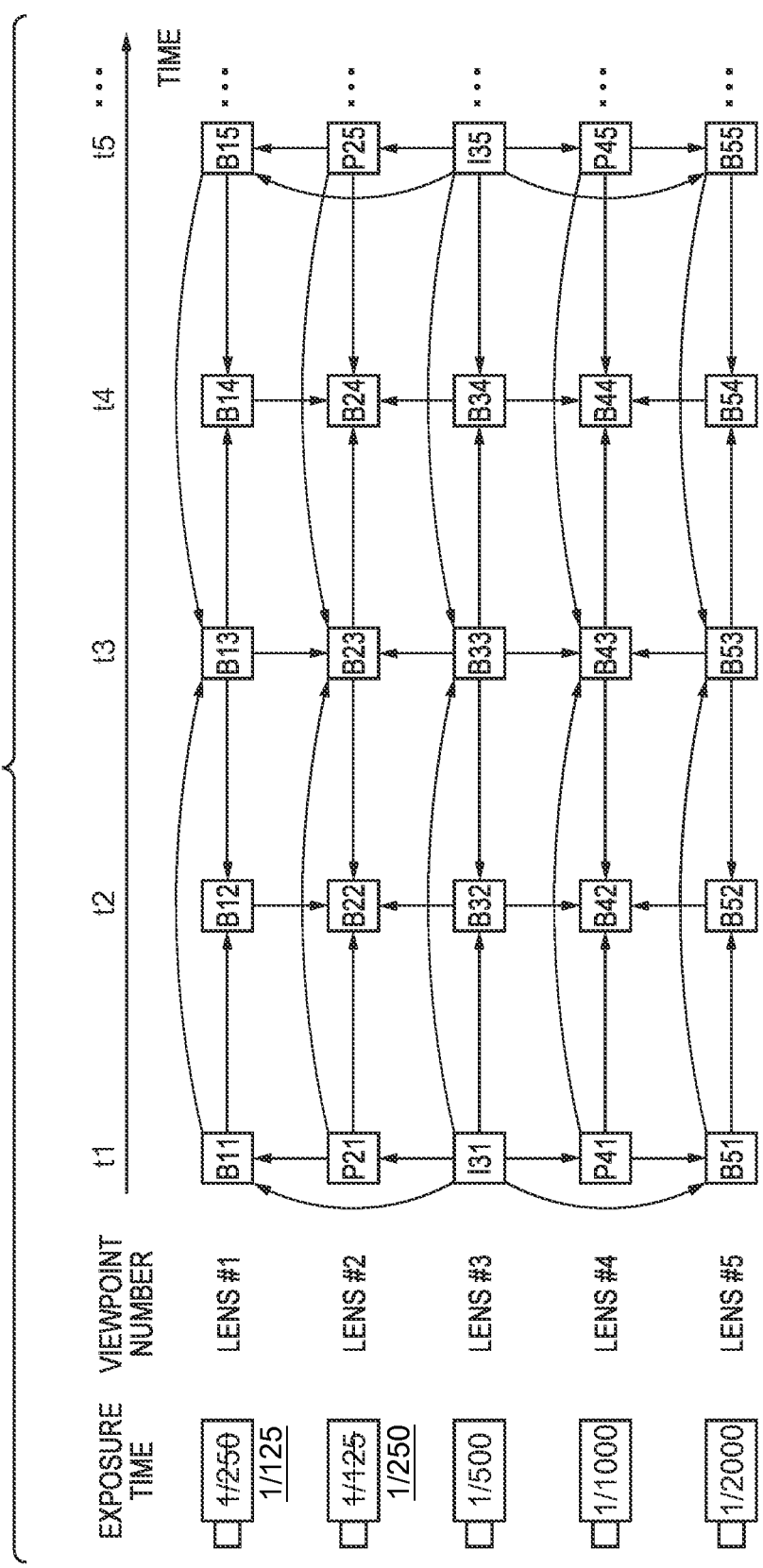
FIG. 4 is a view for explaining encoding processing.

Next, encoding processing for images of each frame captured from the respective viewpoints when the number of viewpoints in an image sensing unit 601 is five will be explained with reference to FIG. 4. The expression in FIG. 4 is the same as that in FIG. 2, and a description thereof will not be repeated. Note that the following description can be similarly expanded to a case in which the number of viewpoints is different from five.

First, the capturing condition acquisition unit 101 acquires, from the image sensing unit 601, the capturing conditions of the respective viewpoints of the image sensing unit 601, that is, sets each of identification information (viewpoint number) unique to each viewpoint and the exposure time of the lens at the viewpoint. In this case, a set of (viewpoint number, exposure time) is acquired for the five respective viewpoints, so five sets of (1, 1/250), (2, 1/125), (3, 1/500), (4, 1/2000), and (5, 1/1000) are acquired. The capturing condition acquisition unit 101 sends the five acquired sets to the reference viewpoint selection unit 102 and prediction type setting unit 307 at the subsequent stage.

The reference viewpoint selection unit 102 refers to the exposure times in these five sets, and specifies the viewpoint number of a reference viewpoint, similar to the first embodiment. In the second embodiment, the viewpoint number of the reference viewpoint is "3". The reference viewpoint selection unit 102 sends "3" as reference viewpoint information to the reference picture selection unit 303 and prediction type setting unit 307. Also, in the second embodiment, the reference viewpoint does not change in a series of encoding processes to generate one stream.

Before a prediction encoding unit 104 and intra-encoding unit 105 encode an encoding target picture from a given viewpoint, the prediction type setting unit 307 determines, by using the capturing condition and reference viewpoint information, whether the following selection criterion 2 is satisfied for this viewpoint:

<Selection Criterion 2>

(1) A viewpoint having a minimum absolute value of an exposure time difference from the reference viewpoint, among viewpoints above or below the reference viewpoint.

(2) The reference viewpoint at the same time provides an I-picture.

If the prediction type setting unit 307 determines that selection criterion 2 is satisfied ((1) and (2) are satisfied), the prediction type setting unit 307 outputs prediction type information to predict the encoding target picture in the forward direction.

In the example of FIG. 4, the absolute value of the difference between the exposure time of the reference viewpoint (viewpoint of viewpoint number=3) and the exposure time of each viewpoint other than the reference viewpoint is calculated as follows (the prediction type setting unit 307 performs this calculation):

(Viewpoint Above Reference Viewpoint)

$$|(\text{exposure time of viewpoint of viewpoint number 1}) - (\text{exposure time of reference viewpoint})| = 3/500$$

$$|(\text{exposure time of viewpoint of viewpoint number 2}) - (\text{exposure time of reference viewpoint})| = 1/500$$

(Viewpoint Below Reference Viewpoint)

$$|(\text{exposure time of viewpoint of viewpoint number 4}) - (\text{exposure time of reference viewpoint})| = 1/1000$$

|(exposure time of viewpoint of viewpoint number 5)−(exposure time of reference viewpoint)|=3/2000

As for viewpoints above the reference viewpoint, the absolute value of the exposure time difference from the reference viewpoint is smaller for the viewpoint of viewpoint number 2 than that of viewpoint number 1. Thus, if the viewpoint is the viewpoint of viewpoint number 2 and the reference viewpoint at the same time provides an I-picture, encoding is performed by forward prediction. As for viewpoints below the reference viewpoint, the absolute value of the exposure time difference from the reference viewpoint is smaller for the viewpoint of viewpoint number 4 than that of viewpoint number 5. If the viewpoint is the viewpoint of viewpoint number 4 and the reference viewpoint at the same time provides an I-picture, encoding is performed by forward prediction.

Next, encoding for images of each frame captured at time t1 from the respective viewpoints starts. An encoding target picture selection unit 603 selects, from an original image buffer 602, an image captured at time t1 from the viewpoint of viewpoint number 3 selected as the reference viewpoint, and supplies it as an encoding target picture to the image encoding apparatus 604.

At this time, no reference picture exists in the reference picture memory 605, so the reference picture selection unit 303 does not select a reference picture. Since no reference picture exists, the prediction encoding unit 104 does not perform prediction encoding. In contrast, the intra-encoding unit 105 generates intra-encoded data by performing intra-encoding for the supplied encoding target picture, and sends the generated intra-encoded data to an encoding mode selection unit 106 at the subsequent stage.

The encoding mode selection unit 106 sends the intra-encoded data sent from the intra-encoding unit 105 as the encoded stream of the image at the reference viewpoint. The encoded stream is expressed as I31 because it has been obtained by intra-encoding.

The encoding target picture selection unit 603 selects, from the original image buffer 602, an image captured at time t1 from the viewpoint of viewpoint number 2, and supplies it as an encoding target picture to the image encoding apparatus 604.

At this time, a "viewpoint having a minimum absolute value of an exposure time difference from the reference viewpoint, among viewpoints above the reference viewpoint" is the viewpoint of viewpoint number 2. The reference viewpoint at time t1 provides an I-picture, and the viewpoint of viewpoint number 2 satisfies selection criterion 2. Hence, the prediction type setting unit 307 outputs "1" as prediction type information to the reference picture selection unit 303. At this time, a picture obtained by locally decoding I31 has been stored as a reference picture in the reference picture memory 605.

Since the prediction type information received from the prediction type setting unit 307 is "1", the reference picture selection unit 303 selects one picture as a reference picture from the reference picture memory 605. Since only I31 has been stored in the reference picture memory 605 at this stage, as described above, the reference picture selection unit 303 selects I31 as a reference picture. Then, the reference picture selection unit 303 sends I31 selected from the reference picture memory 605 to the prediction encoding unit 104.

The prediction encoding unit 104 uses I31 sent from the reference picture selection unit 303 as a reference picture, and performs forward prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 sends, as an encoded stream, data having a smaller code amount out of the prediction-encoded data output from the prediction encoding unit 104 and the intra-encoded data output from the intra-encoding unit 105. Since an image captured at time t1 from the viewpoint of viewpoint number 2 has been obtained by inter-viewpoint prediction from only I31, its encoded stream is expressed as P21.

After that, the encoding target picture selection unit 603 selects, from the original image buffer 602, an image captured at time t1 from the viewpoint of viewpoint number 1, and supplies it as an encoding target picture to the image encoding apparatus 604.

At this time, a "viewpoint having a minimum absolute value of an exposure time difference from the reference viewpoint, among viewpoints above the reference viewpoint" is not the viewpoint of viewpoint number 1. For this reason, the prediction type setting unit 307 outputs "0" as prediction type information to the reference picture selection unit 303. At this time, pictures obtained by locally decoding I31 and P21 have been stored as reference pictures in the reference picture memory 605.

Since the prediction type information received from the prediction type setting unit 307 is "0", the reference picture selection unit 303 selects I31 and P21 as reference pictures from the reference picture memory 605, similar to the first embodiment. The reference picture selection unit 303 sends I31 and P21 selected from the reference picture memory 605 to the prediction encoding unit 104.

The prediction encoding unit 104 uses I31 and P21 sent from the reference picture selection unit 303 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t1 from the viewpoint of viewpoint number 1 has been obtained by inter-viewpoint prediction from I31 and P21, its encoded stream is expressed as B11.

Then, the encoding target picture selection unit 603 selects, from the original image buffer 602, an image captured at time t1 from the viewpoint of viewpoint number 4, and supplies it as an encoding target picture to the image encoding apparatus 604.

At this time, a "viewpoint having a minimum absolute value of an exposure time difference from the reference viewpoint, among viewpoints below the reference viewpoint" is the viewpoint of viewpoint number 4. The reference viewpoint at time t1 provides an I-picture, and the viewpoint of viewpoint number 4 satisfies selection criterion 2. Therefore, the prediction type setting unit 307 outputs "1" as prediction type information to the reference picture selection unit 303. At this time, pictures obtained by locally decoding B11, P21, and I31 have been stored as reference pictures in the reference picture memory 605.

Since the prediction type information received from the prediction type setting unit 307 is "1", the reference picture selection unit 303 selects one picture as a reference picture from the reference picture memory 605. At this stage, B11, P21, and I31 have been stored in the reference picture memory 605, as described above, and a picture of a viewpoint number closest to the viewpoint (viewpoint number=4) of the encoding target picture is I31 (viewpoint number=3). Thus, the reference picture selection unit 303 selects I31, and sends I31 selected from the reference picture memory 605 to the prediction encoding unit 104.

The prediction encoding unit 104 uses I31 sent from the reference picture selection unit 303 as a reference picture, and performs forward prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t1 from the viewpoint of viewpoint number 4 has been obtained by inter-viewpoint prediction from only I31, its encoded stream is expressed as P41.

In this manner, the second embodiment is different from the first embodiment in processing for an image of the same frame as a frame having undergone intra-encoding at the reference viewpoint, out of images of each frame captured from viewpoints having capturing condition closer to that of the reference viewpoint. More specifically, forward prediction encoding is performed by referring to an image of the frame captured at a viewpoint arranged closest to a viewpoint having a capturing condition closer to that of the reference viewpoint.

Thereafter, the encoding target picture selection unit 603 selects, from the original image buffer 602, an image captured at time t1 from the viewpoint of viewpoint number 5, and supplies it as an encoding target picture to the image encoding apparatus 604.

At this time, a "viewpoint having a minimum absolute value of an exposure time difference from the reference viewpoint, among viewpoints below the reference viewpoint" is not the viewpoint of viewpoint number 5. Thus, the prediction type setting unit 307 outputs "0" as prediction type information to the reference picture selection unit 303. At this time, pictures obtained by locally decoding B11, P21, I31, and P41 have been stored as reference pictures in the reference picture memory 605.

Since the prediction type information received from the prediction type setting unit 307 is "0", the reference picture selection unit 303 selects I31 and P41 as reference pictures from the reference picture memory 605, similar to the first embodiment. The reference picture selection unit 303 sends I31 and P41 selected from the reference picture memory 605 to the prediction encoding unit 104.

The prediction encoding unit 104 uses I31 and P41 sent from the reference picture selection unit 303 as reference pictures, and performs bidirectional prediction and encoding for the encoding target picture supplied from the encoding target picture selection unit 603, generating prediction-encoded data. The prediction encoding unit 104 sends the generated prediction-encoded data to the encoding mode selection unit 106 at the subsequent stage.

The intra-encoding unit 105 performs intra-encoding for the encoding target picture supplied from the encoding target picture selection unit 603, generating intra-encoded data. The intra-encoding unit 105 sends the generated intra-encoded data to the encoding mode selection unit 106 at the subsequent stage.

The encoding mode selection unit 106 outputs, as an encoded stream, data having a smaller code amount out of the prediction-encoded data output from the prediction encoding unit 104 and the intra-encoded data output from the intra-encoding unit 105. Since an image captured at time t1 from the viewpoint of viewpoint number 5 has been obtained by inter-viewpoint prediction from I31 and P41, its encoded stream is expressed as B51.

In this fashion, encoding at time t1 is executed. Then, encoding at time t5 starts, but the processing is the same as that at time t1 and a description thereof will not be repeated. After that, encoding at times t3, t2, and t4 is executed, but the same processing as that in the first embodiment is performed and a description thereof will not be repeated. The same processing as described above is repeated until encoding of all pictures is completed.

The above-described method performs inter-viewpoint prediction for pictures from viewpoints close in capturing condition to the viewpoint of an encoding target picture, thereby increasing the encoding efficient. By performing forward prediction between viewpoints having a minimum capturing condition difference, propagation of the prediction residual can be reduced, and the encoding efficient can be further increased.

Third Embodiment

Figure 5:
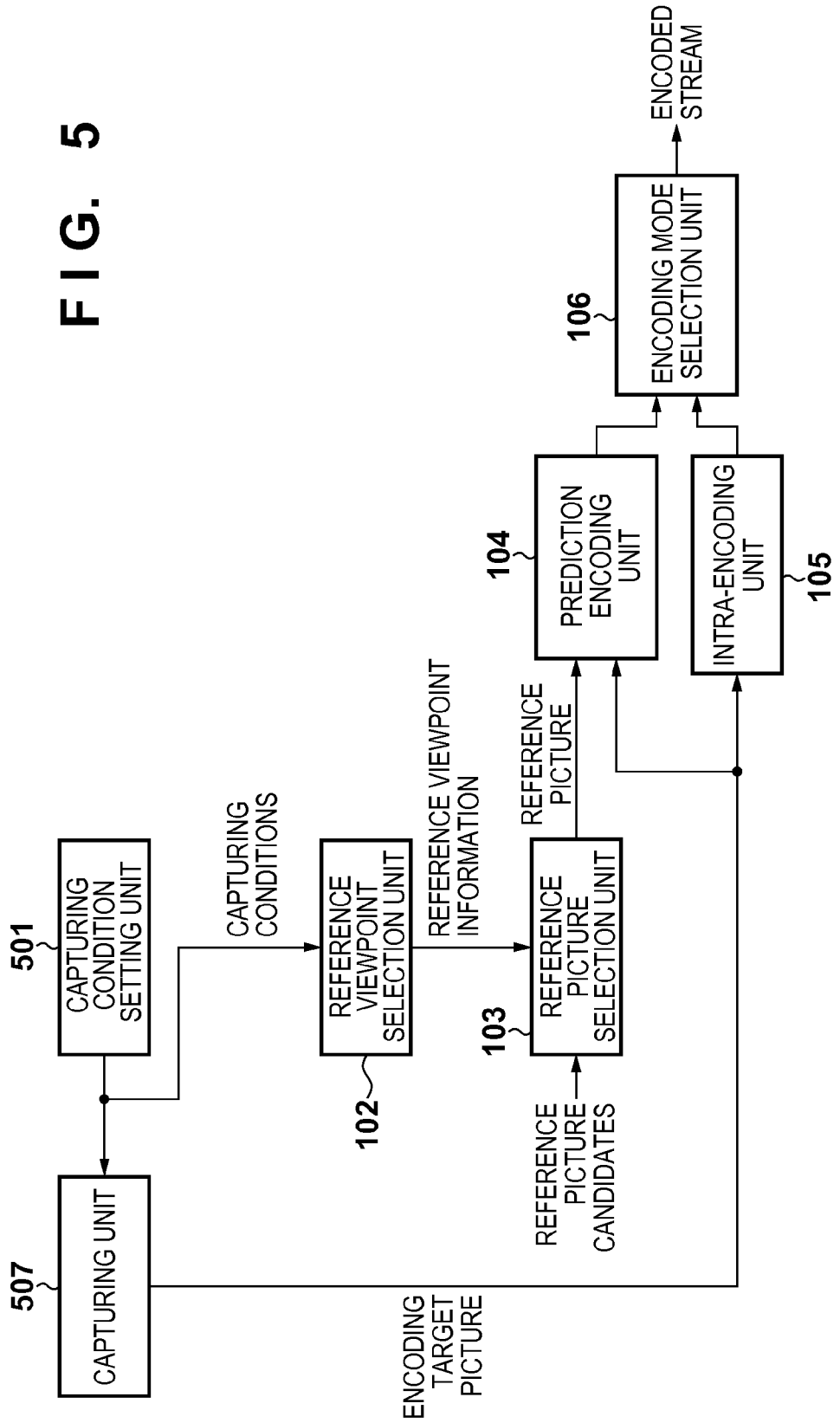
FIG. 5 is a block diagram exemplifying the functional arrangement of a camera apparatus.

The third embodiment will describe a camera apparatus having an example of a functional arrangement shown in FIG. 5. In FIG. 5, the same reference numerals as those in FIG. 1 denote the same parts, and a description thereof will not be repeated.

A capturing condition setting unit 501 acquires a list of capturing conditions set for the respective viewpoints of a capturing unit 507, and determines capturing conditions to be set for the respective viewpoints from the list. The third embodiment also uses the exposure time as the capturing condition, but the capturing condition is not limited to the exposure time, similar to the above embodiments. The capturing condition setting unit 501 sends capturing conditions determined for the respective viewpoints to the capturing unit 507 and a reference viewpoint selection unit 102.

The capturing unit 507 has a plurality of viewpoints. Upon receiving the capturing conditions of the respective viewpoints from the capturing condition setting unit 501, the capturing unit 507 performs moving image capturing corresponding to the capturing conditions of the viewpoints from the respective viewpoints. Images of each frame captured from the respective viewpoints are accumulated in a memory (not shown) inside the capturing unit 507. The accumulated images are sent to a prediction encoding unit 104 and intra-encoding unit 105 in a predetermined order.

Next, encoding processing for images of each frame captured from the respective viewpoints when the number of viewpoints in the capturing unit 507 is five (that is, the capturing unit 507 has the same arrangement as that of an image sensing unit 601) will be explained with reference to FIG. 2. Note that the following description can be similarly expanded to a case in which the number of viewpoints is different from five.

First, the capturing condition setting unit 501 acquires a list of capturing conditions by the same number as the number of viewpoints of the capturing unit 507. The acquisition source is not limited to a specific one, the user may input the list by operating a user interface (not shown), or the list may be input from an external device via a wireless or wired network. Since a list of capturing conditions (exposure times) for the five respective viewpoints is acquired, a list (1/125, 1/250, 1/500, 1/1000, and 1/2000) is acquired.

The capturing condition setting unit 501 specifies an exposure time serving as a median by referring to exposure times in the list. In FIG. 2, the median is 1/500 among the exposure times of 1/250, 1/125, 1/500, 1/2000, and 1/1000. To set 1/500 as an exposure time for the central viewpoint (viewpoint of viewpoint number=3) among the five viewpoints, (3, 1/500) is generated as a capturing condition for the viewpoint of viewpoint number=3.

Also, to set 1/250 close to the exposure time of the viewpoint of viewpoint number=3, as an exposure time for the viewpoint of viewpoint number=1 to undergo forward prediction encoding together with the viewpoint of viewpoint number=3, (1, 1/250) is generated as a capturing condition for the viewpoint of viewpoint number=1.

To set 1/1000 close to the exposure time of viewpoint number=3, as an exposure time for the viewpoint of viewpoint number=5 to undergo forward prediction encoding together with the viewpoint of viewpoint number=3, (5, 1/1000) is generated as a capturing condition for the viewpoint of viewpoint number=5.

To set 1/125 close to the exposure time of viewpoint number=1 and the exposure time of viewpoint number=3, as an exposure time for the viewpoint of viewpoint number=2, (2, 1/125) is generated as a capturing condition for the viewpoint of viewpoint number=2.

To set 1/2000 close to the exposure time of viewpoint number=3 and the exposure time of viewpoint number=5, as an exposure time for the viewpoint of viewpoint number=4, (4, 1/2000) is generated as a capturing condition for the viewpoint of viewpoint number=4.

The capturing condition setting unit 501 sends, to the capturing unit 507 and reference viewpoint selection unit 102, the capturing conditions (1, 1/250), (2, 1/125), (3, 1/500), (4, 1/2000), and (5, 1/1000) generated for the respective viewpoints. Note that the capturing conditions of the respective viewpoints do not change in a series of moving image encoding processes.

Upon receiving the capturing conditions of the respective viewpoints from the capturing condition setting unit 501, the capturing unit 507 sets the capturing conditions of the viewpoints for the respective viewpoints (for a viewpoint of viewpoint number A, sets an exposure time in a capturing condition containing viewpoint number=A). After setting, the capturing unit 507 performs moving image capturing from the respective viewpoints.

Upon receiving the capturing conditions of the respective viewpoints from the capturing condition setting unit 501, the reference viewpoint selection unit 102 specifies reference viewpoint information, as described in the first embodiment, and sends it to a reference picture selection unit 103. Similar to the first embodiment, even the reference viewpoint information does not change in a series of moving image encoding processes. Subsequent processing is the same as that described in the first embodiment.

In this fashion, exposure times are acquired by the same number as the number of viewpoints. A median among the same number of exposure times is set for the central viewpoint in the arrangement of a plurality of viewpoints. For the viewpoints other than the central viewpoint, exposure times are selected and set from the same number of exposure times to minimize the exposure time difference between viewpoints in forward inter-viewpoint prediction.

The above-described method performs inter-viewpoint prediction for pictures from viewpoints close in capturing condition to the viewpoint of an encoding target picture, thereby increasing the encoding efficient of a captured picture.

As is apparent from the above description, all the above embodiments are merely examples of the following arrangement. More specifically, for respective viewpoints, the capturing conditions of images at the respective viewpoints, and images of each frame captured from the viewpoints in accordance with the capturing conditions are acquired. By using the capturing conditions acquired for the respective viewpoints, one of the viewpoints is selected as a reference viewpoint. Prediction encoding and intra-encoding are performed for the acquired images. For the respective viewpoints for each frame, the encoding result of images of the frame captured from the respective viewpoints by prediction encoding or intra-encoding is output.

When performing prediction encoding for an image captured from the reference viewpoint, prediction encoding is performed by referring to an image captured from the reference viewpoint without referring to images captured from the viewpoints other than the reference viewpoint.

Fourth Embodiment

Respective units shown in FIGS. 1 and 3 (in FIG. 5, respective units except for a capturing unit 507) may be formed from hardware, but may be formed from software (computer programs). In this case, in a computer including a CPU and memory, the software is loaded into the memory, and the CPU executes the loaded computer program. The computer can implement the functions of these units.

Fifth Embodiment

The above-described embodiments may be appropriately combined. In the system arrangement shown in FIG. 6, one or more of an original image buffer 602, encoding target picture selection unit 603, and reference picture memory 605 may be constituent components in an image encoding apparatus 604.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-132365 filed Jun. 11, 2012 which is hereby incorporated by reference herein in its entirety.

What is claimed is:

1. An image processing apparatus comprising:
an acquisition unit configured to acquire, for each of respective viewpoints, capturing condition at the viewpoint, and each frame image captured from the viewpoint in accordance with the capturing condition; and
a prediction coding unit configured to perform prediction coding for the frame images acquired by the acquisition unit,
wherein the respective viewpoints include (i) a reference viewpoint being defined based on the capturing conditions at the respective viewpoints, (ii) a first viewpoint, and (iii) a second viewpoint, wherein a value representing the capturing condition at the first viewpoint is less than a value representing the capturing condition at the reference viewpoint and a value representing the capturing condition at the second viewpoint is more than a value representing the capturing condition at the reference viewpoint, and
wherein if the prediction coding unit performs prediction coding for the frame image captured from one viewpoint of the first and second viewpoints, the prediction coding unit generates a predicted picture by using at least one of the frame image captured from the reference viewpoint and the frame image captured from the one viewpoint as a reference picture without using the frame image captured from another viewpoint of the first and second viewpoints as the reference picture and performs prediction coding for the frame image captured from the one viewpoint by using the generated predicted picture,
wherein at least one processor is used to implement the units of the apparatus.

2. The apparatus according to claim 1, wherein the capturing condition includes at least one of exposure time at the viewpoint, f-number, brightness, lens position, and sensor sensitivity.

3. The apparatus according to claim 1, wherein the reference viewpoint is a viewpoint whose capturing condition is represented by a value serving as a median among the values representing the capturing conditions acquired for the respective viewpoints.

4. The apparatus according to claim 1, wherein the reference viewpoint is a viewpoint whose capturing condition is represented by a value closest to an average value of the values representing the capturing conditions acquired for the respective viewpoints.

5. The apparatus according to claim 1, further comprising:
an intra-coding unit configured to perform intra-coding for the frame images acquired by the acquisition unit, and wherein, for a frame image whose frame is the same as that of a frame image having undergone intra-coding at the reference viewpoint out of frame images captured from a viewpoint having a capturing condition closer to the capturing condition of the reference viewpoint, the prediction coding unit performs forward prediction coding by referring to a frame image of the same frame captured from a viewpoint arranged closest to the viewpoint having the capturing condition closer to the capturing condition of the reference viewpoint.

6. The apparatus according to claim 1, further comprising an exposure acquiring unit configured to acquire exposure times by the same number as the number of the viewpoints, for a central viewpoint in an arrangement of the viewpoints, sets a median among the same number of exposure times, and for the viewpoints other than the central viewpoint, selects and sets exposure times from the same number of exposure times to minimize an exposure time difference between viewpoints in forward inter-viewpoint prediction.

7. The apparatus to claim 1, further comprising:
an intra-coding unit configured to perform intra-coding for the frame images acquired by the acquisition unit; and
an output unit configured to output, for each of the respective viewpoints for each frame, a coding result of the frame image captured from the viewpoint by the prediction coding unit or the intra-coding unit.

8. The apparatus according to claim 7, wherein the output unit outputs, for each of the respective viewpoints for each frame, a coding result having a smaller data size, out of a coding result of the frame image captured from the viewpoint by the prediction coding unit and a coding result of the frame image captured from the viewpoint by the intra-coding unit.

9. The apparatus according to claim 7, wherein the output unit outputs, for each of the respective viewpoints for each frame, a coding result having a smaller data size during coding, out of a coding result of the frame image captured from the viewpoint by the prediction coding unit and a coding result of the frame image captured from the viewpoint by the intra-coding unit.

10. The apparatus according to claim 1, wherein the prediction coding unit performs prediction coding for the frame image captured from the reference viewpoint by referring to the frame image captured from the reference viewpoint without referring to frame images captured from the viewpoints other than the reference viewpoint.

11. The apparatus according to claim 1, further comprising a selection unit which selects one of the respective viewpoints as the reference viewpoint by using the capturing conditions acquired by the acquisition unit for the respective viewpoints.

12. An image processing method to be performed by an image processing apparatus, comprising:
acquiring, for each of respective viewpoints, capturing condition at the viewpoint, and each frame image captured from the viewpoint in accordance with the capturing condition; and
performing prediction coding for the acquired frame images,
wherein the respective viewpoints include (i) a reference viewpoint being defined based on the capturing conditions at the respective viewpoints, (ii) a first viewpoint, and (iii) a second viewpoint, wherein a value representing the capturing condition at the first viewpoint is less than a value representing the capturing condition at the reference viewpoint and a value representing the capturing condition at the second viewpoint is more than a value representing the capturing condition at the reference viewpoint, and wherein, if prediction coding is performed for the frame image captured from one viewpoint of the first and second viewpoints, a predicted picture is generated by using at least one of the frame image captured from the reference viewpoint and the frame image captured from the one viewpoint as a reference picture without using the frame image captured from another viewpoint of the first and second viewpoints as the reference picture and prediction coding is performed for the frame image captured from the one viewpoint by using the generated predicted picture.

13. A non-transitory computer-readable storage medium storing a computer program for causing a computer to function as:
   an acquisition unit configured to acquire, for each of respective viewpoints, capturing condition at the viewpoint, and each frame image captured from the viewpoint in accordance with the capturing condition; and
   a prediction coding unit configured to perform prediction coding for the frame images acquired by the acquisition unit,
   wherein the respective viewpoints include (i) a reference viewpoint being defined based on the capturing conditions at the respective viewpoints, (ii) a first viewpoint, and (iii) a second viewpoint, wherein a value representing the capturing condition at the first viewpoint is less than a value representing the capturing condition at the reference viewpoint and a value representing the capturing condition at the second viewpoint is more than a value representing the capturing condition at the reference viewpoint, and
   wherein if the prediction coding unit performs prediction coding for the frame image captured from one viewpoint of the first and second viewpoints, the prediction coding unit generates a predicted picture by using at least one of the frame image captured from the reference viewpoint and the frame image captured from the one viewpoint as a reference picture without using the frame image captured from another viewpoint of the first and second viewpoints as the reference picture and performs prediction coding for the frame image captured from the one viewpoint by using the generated predicted picture.

* * * * *